(12) United States Patent
Pesti

(10) Patent No.: US 9,289,099 B2
(45) Date of Patent: Mar. 22, 2016

(54) SANDWICH MAKING ACCESSORY

(71) Applicant: Glenn Pesti, Warren, MI (US)

(72) Inventor: Glenn Pesti, Warren, MI (US)

(*) Notice: Subject to any disclaimer, the term of this patent is extended or adjusted under 35 U.S.C. 154(b) by 0 days.

(21) Appl. No.: 14/032,539

(22) Filed: Sep. 20, 2013

(65) Prior Publication Data
US 2014/0076179 A1 Mar. 20, 2014

Related U.S. Application Data

(60) Provisional application No. 61/703,505, filed on Sep. 20, 2012.

(51) Int. Cl.
*A47J 43/28* (2006.01)
(52) U.S. Cl.
CPC .................................. *A47J 43/283* (2013.01)
(58) Field of Classification Search
USPC .............. 294/16, 99.2, 28, 106, 3, 7, 26, 164; D7/683, 686; 100/234
See application file for complete search history.

(56) References Cited

U.S. PATENT DOCUMENTS

| 3,760,501 A | * | 9/1973 | Johnston | 294/61 |
| 4,904,009 A | * | 2/1990 | Kozlinski | 294/7 |
| 5,123,689 A | * | 6/1992 | Fields | 294/99.2 |
| 5,934,721 A | * | 8/1999 | Walde | 294/99.2 |
| D458,520 S | * | 6/2002 | Rowe et al. | D7/686 |
| D477,189 S | * | 7/2003 | Bull et al. | D7/686 |
| D477,504 S | * | 7/2003 | Rowe et al. | D7/686 |
| D519,332 S | * | 4/2006 | Sanchez | D7/686 |
| 7,882,641 B2 | * | 2/2011 | Repac | 30/114 |
| D679,154 S | * | 4/2013 | Sawicki | D7/686 |
| D679,693 S | * | 4/2013 | Rashid | D14/250 |
| D679,963 S | | 4/2013 | Zemel | |
| D692,284 S | * | 10/2013 | Horito et al. | D7/686 |
| 2003/0107226 A1 | * | 6/2003 | Wang et al. | 294/16 |
| 2004/0026939 A1 | * | 2/2004 | Jordan et al. | 294/3 |
| 2012/0321775 A1 | * | 12/2012 | Parker | 294/99.2 |

* cited by examiner

*Primary Examiner* — Paul T Chin
(74) *Attorney, Agent, or Firm* — Avery N. Goldstein; Blue Filament Law

(57) ABSTRACT

A sandwich making accessory, where embodiments of the inventive device aligns the edges of a bottom and top food material used for making a sandwich while maintaining constant user determined pressure on the sandwiched food materials is provided. The constant and evenly distributed pressure applied by embodiments of the sandwich making accessory provides for an even distribution of the fill materials within the top and bottom food materials without the fill materials spilling out over the edges. The enclosing materials that bound the sandwich interior fill may include slices of bread, cake, waffles, graham crackers, cookies, biscuits, and other consumable products. The inventive accessory allows for easier pick up and when closed evenly distributes the pressure over the whole surface of the top and bottom enclosing crackers which lessens the chance of cracker breakage.

12 Claims, 4 Drawing Sheets

US 9,289,099 B2

SANDWICH MAKING ACCESSORY

CROSS-REFERENCE TO RELATED APPLICATION

This application claims priority of U.S. Provisional Patent Application Ser. No. 61/703,505 filed Sep. 20, 2012, which is incorporated herein by reference.

FIELD OF THE INVENTION

The present invention in general relates to food products and cooking accessories and in particular to a cooking accessory and method for the combination of food products into a sandwiched product.

BACKGROUND OF THE INVENTION

Many food products consist of combining food materials into a single sandwiched meal or treat. Many types of sandwiches are generally cooked, either to warm ingredients, enhance flavor, melt ingredients, or cause toasting of some or all the ingredients. Typically problems are encountered in keeping the ingredients together and avoiding a mess while making these types of sandwiches. Also, an operator must lay the incomplete sandwich on a flat surface while the innards are prepared, usually by being cooked and then, the operator must attempt to balance the unstable portions during joinder.

A common sandwich, often made while camping, is s'mores. S'mores cookie sandwiches are a well-known treat, typically made of one or two marshmallows and a small slab of milk chocolate sandwiched between two graham crackers, which is all then cooked until the marshmallow and chocolate soften and begin to melt. Generally, the marshmallow is heated by a heat source, such as a grill, toaster, oven or range, and then placed in between the graham crackers with portions of chocolate where the graham crackers are then slightly compressed. The heated marshmallow causes the chocolate to melt, making a tasty, gooey snack. However, the marshmallow and chocolate, when melted, have a tendency to spread beyond the cracker edges and making a mess.

Numerous other types of sandwiches such as grilled cheese, or a combination of a cheese, meat, and a bread product often encounter similar problems. Similar issues arise with making cold sandwiches when using viscous ingredients such as peanut butter, jelly, or marshmallow fluff. In all such cases, it remains a challenge to keep the components of the heated sandwiches together during compression, cooking and/or serving of the sandwiches without the internal food products spilling or oozing out over edges thereby making a mess and the sandwich lees enjoyable.

Thus, there exists a need for a cooking accessory for making combinations of food products into a sandwiched product while avoiding the food products from spilling or oozing out from the sandwich

SUMMARY OF THE INVENTION

A sandwich making accessory, where embodiments of the inventive device aligns the edges of a bottom and top food material used for making a sandwich while maintaining constant user determined pressure on the sandwiched food materials between the top and bottom food materials is provided. The constant and evenly distributed pressure applied by embodiments of the sandwich making accessory provides for an even distribution of the fill materials within the top and bottom food materials without the fill materials spilling out over the edges. The enclosing materials that bound the sandwich interior fill may include slices of bread, cake, waffles, graham crackers, cookies, biscuits, and other consumable products. The inventive accessory allows for easier pick up and when closed evenly distributes the pressure over the whole surface of the top and bottom enclosing crackers which lessens the chance of cracker breakage.

The sandwich making accessory includes at least one cantilevered arm having a handle and a food holding end. The food holding end is a cup, a container, a flat surface, a flat surface with stationary rails for holding a top or bottom sandwich material, or a flat surface with cam rails that fold down when a cam releasing device is operated.

In inventive embodiments where more than one cantilevered arm is used the sandwich making accessory, the arms are interconnected through a connecting means, whereby the connecting means is a pivot connector, or a welded connector. In an embodiment, the arms may be removed from the pivot connector via snap fits to facilitate cleaning. The pivot connector may be made of different or similar materials to the arms. For example, the pivot connector may be made of a heat resistant material so as to protect a user's hand from a heat source that may be used on the sandwich making end of the device. Two or more cantilevered arms may also be made from a single piece of material folded over, similar to a pair of tongs. Examples of materials that may be used for making components of the sandwich making accessory include, but are not limited to wood, metal, plastic, carbon fiber, Teflon, or other materials or polymers commonly used in making cooking accessories.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The present invention has utility as a sandwich making accessory, where embodiments of the inventive device aligns the edges of a bottom and top food material used for making a sandwich while maintaining constant user determined pressure on the sandwiched food materials (hereinafter referred to as fill materials) between the top and bottom food materials. The constant and evenly distributed pressure applied by embodiments of the sandwich making accessory provides for an even distribution of the fill materials within the top and bottom food materials without the fill materials spilling out over the edges. While the enclosing materials that bound the sandwich interior are referring to hereafter as "crackers", it should be appreciated that the present invention is equally amenable to usage with slices of bread, cake, waffles, graham crackers, cookies, biscuits, and other consumable products. The inventive accessory allows for easier pick up and when closed evenly distributes the pressure over the whole surface of the top and bottom enclosing crackers which lessens the chance of cracker breakage.

The sandwich making accessory includes at least one cantilevered arm having a handle and a food holding end. The food holding end is a cup, a container, a flat surface, a flat surface with stationary rails for holding a top or bottom sandwich material, or a flat surface with cam rails that fold down when a cam releasing device is operated.

In inventive embodiments where more than one cantilevered arm is used the sandwich making accessory, the arms are interconnected through a connecting means, whereby the connecting means is a pivot connector, or a welded connector. In an embodiment, the arms may be removed from the pivot connector via snap fits to facilitate cleaning. The pivot connector may be made of different or similar materials to the arms. For example, the pivot connector may be made of a heat resistant material so as to protect a user's hand from a heat source that may be used on the sandwich making end of the device. Two or more cantilevered arms may also be made from a single piece of material folded over, similar to a pair of tongs. Examples of materials that may be used for making components of the sandwich making accessory include, but are not limited to wood, metal, plastic, carbon fiber, Teflon, or other materials or polymers commonly used in making cooking accessories.

Figure 1A:
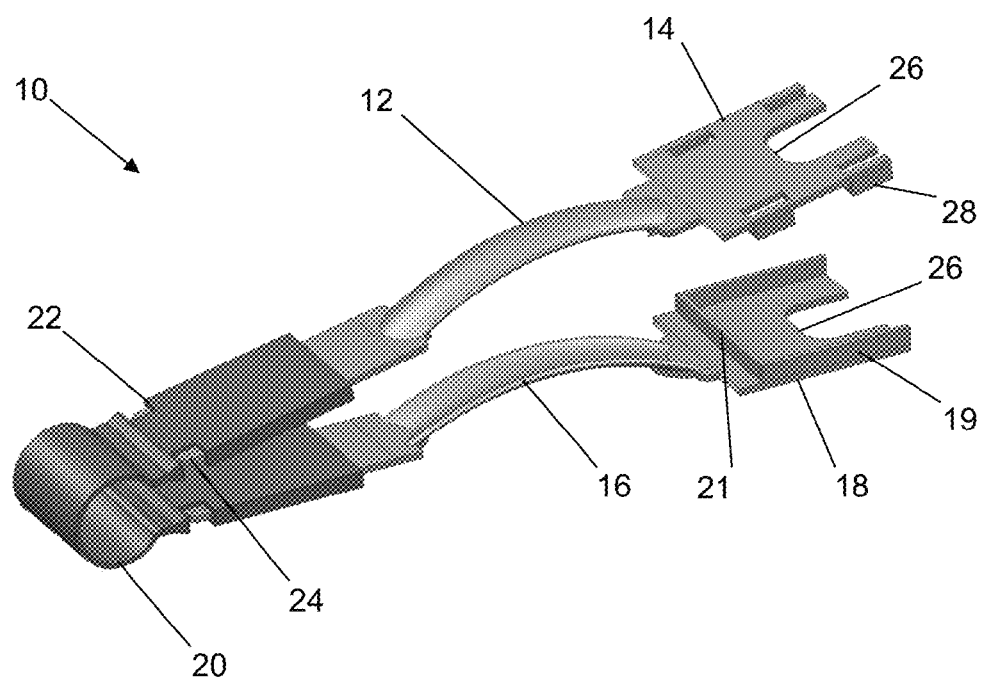
FIGS. 1A-1C illustrate a series of perspective views of an embodiment of the sandwich making accessory.
Figure 1B:
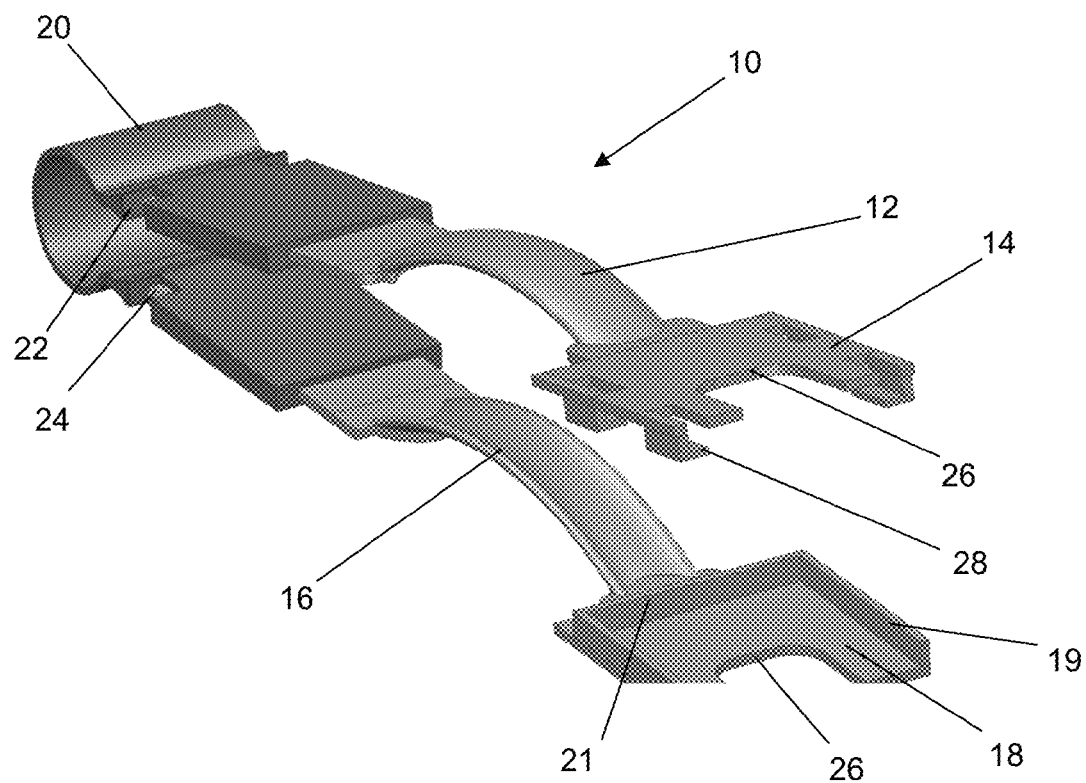
Figure 1C:
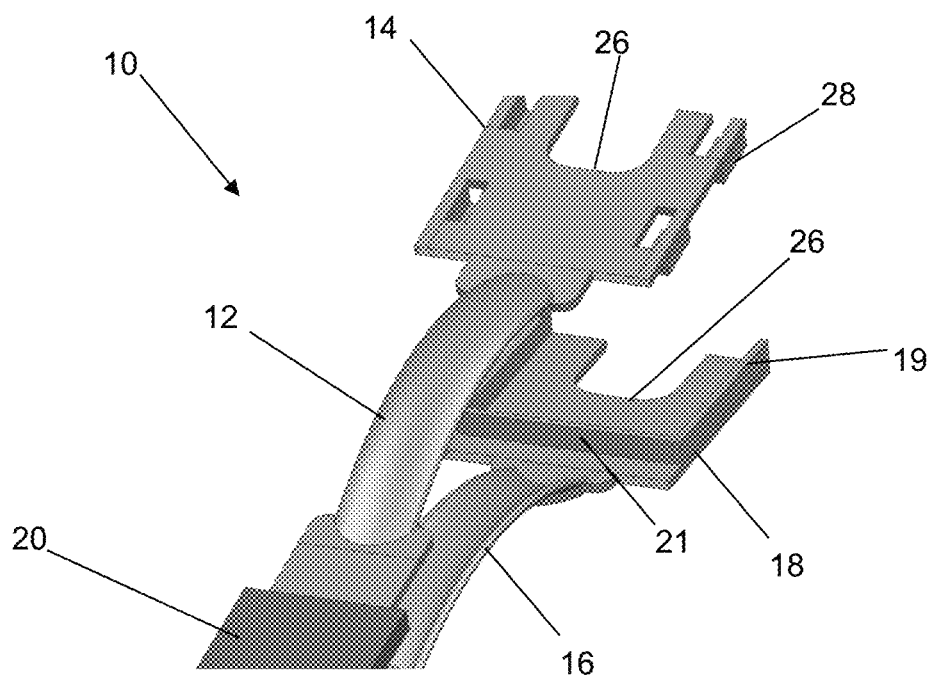
Figure 2:
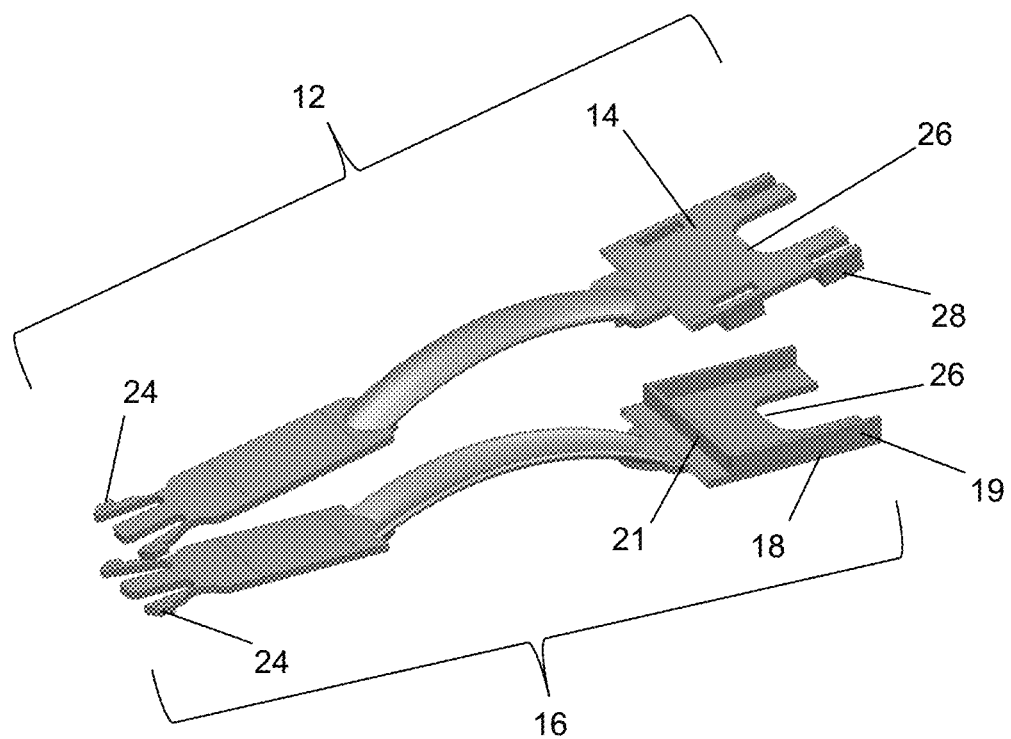
FIG. 2 illustrates a detailed perspective view of the upper and lower arms of FIGS. 1A-1C disengaged from the pivot connector according to embodiments of the invention.
Figure 3:
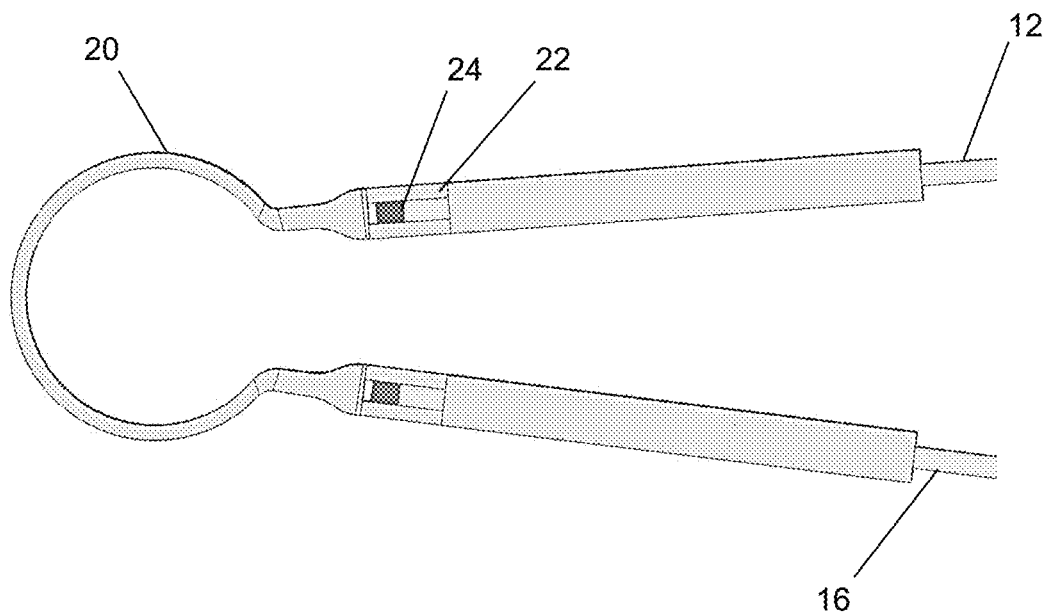
FIG. 3 is a detail side perspective view of the pivot connector of FIGS. 1A-1C.

With reference to the attached figures, an embodiment of an inventive sandwich making accessory is depicted generally at 10 in FIGS. 1A-1C. The sandwich making accessory 10 has an upper arm 12 with a distal end terminated with an upper food holding end 14, and a lower arm 16 with a distal end terminated with a lower food holding end 18. The proximal ends of the upper arm 12 and lower arm have tabs 24, as more clearly shown in FIG. 2, that engage with slots 22 of the pivot connector 20, when the arms (12, 16) are inserted into the pivot connector 20. The pivot connector 20 is biased open as shown in FIG. 3, but is configured to allow a user to compress the upper and lower arms (12, 16) together to form a sandwich. The upper holding end 14 may have a set of stationary rails 28 for holding a cracker when forming a sandwich. The lower food holding end 18 has a pair of side walls 19 and a back wall 21. The finger slots 26 in the upper and lower arms (12, 16) allow for ease of sandwich removal.

EXAMPLES

Figure 4:
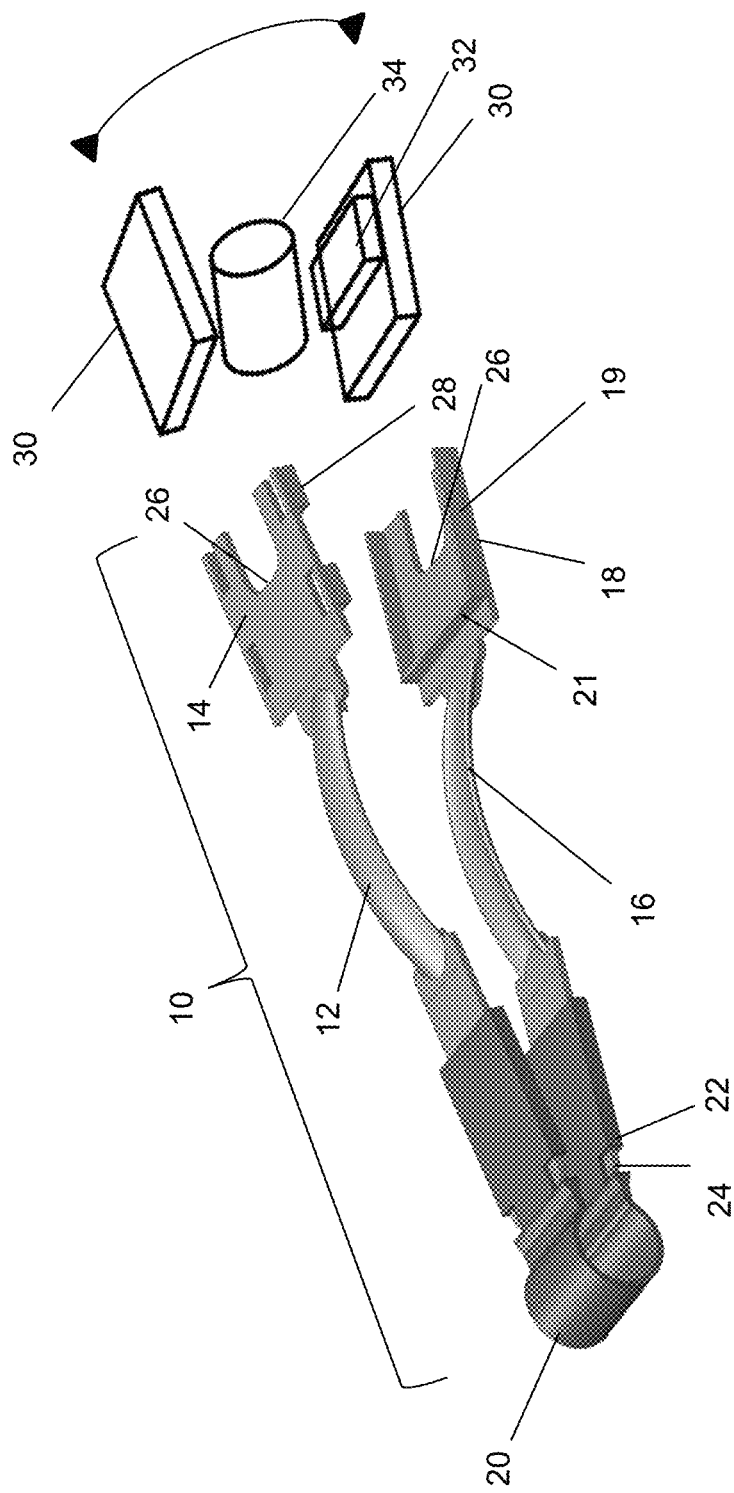
FIG. 4 is a perspective view of an embodiment of the sandwich making accessory making a s'more sandwich.

The inventive device is used for making a s'more sandwich as shown in FIG. 4. A user places a graham cracker 30 into the rails 28 of a top food holding end 14 and a bottom food holding end 18. The user places a piece of chocolate 32 onto the bottom graham cracker 30 while heating a marshmallow 34. The heated marshmallow 34 is then placed atop the chocolate 32 and the sandwich making accessory 10 is then closed to a predetermined position, or in the alternative, to a user defined position based on a user's preference for a desired distribution of the melted marshmallow and chocolate between the graham crackers, while maintaining the relative positions of the graham crackers. An optional locking device (not shown) is then used to maintain the pressure, or the user maintains compressive pressure on the pivot connector while the chocolate and marshmallow slightly cool to an edible temperature.

Depending on the material used, the marshmallow and chocolate may be placed between the graham crackers while cold and into the sandwich making accessory, whereby the sandwich making accessory is then heated to heat the chocolate and marshmallow so that they spread through the graham crackers. Once the desired distribution of the marshmallow and chocolate is reached between the graham crackers and the sandwich has cooled to the desired temperature, the user may slide the completed sandwich out of the open end of the sandwich making accessory.

The sandwich making accessory may be used for making hot sandwiches or cold sandwiches. For instance it may be used to make a cold sandwich such as peanut butter and jelly, peanut butter and marshmallow fluff, or any other combination of gooey and viscous sandwich making foods. In addition, heated sandwiches may be made such as grilled cheese or a grilled ham and cheese sandwich.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A sandwich making accessory comprising:
   an upper arm with a distal end terminated with an upper food holding end, where said upper food holding end is configured with a set of rails on opposing sides of said upper food holding end;
   a lower arm with a distal end terminated with a lower food holding end, where said lower food holding end has a pair of side walls and a back wall;
   a pivot connector that joins a proximal end of said upper arm and a proximal end of said lower arm; and
   wherein said set of rails form a set of opposing right angle bends to retain an inserted top cracker when forming a sandwich with a lower cracker retained in said lower food holding end.

2. The sandwich making accessory of claim 1 further comprising finger slots at said upper food holding end and said lower food holding end.

3. The sandwich making accessory of claim 1 wherein said pivot connector is biased in an open position, and is configured to allow a user to compress said upper arm and said lower arm together to form the sandwich.

4. The sandwich making accessory of claim 1 wherein said pivot connector is integral with said upper arm and said lower arm by being made from a single piece of a material folded over similar to a tong.

5. The sandwich making accessory of claim 1 wherein said accessory is made of materials comprising wood, metal, plastic, carbon fiber, Teflon, or other materials or polymers commonly used in making cooking accessories.

6. The sandwich making accessory of claim 1 wherein said accessory is made of plastic.

7. The sandwich making accessory of claim 1 wherein said pivot connector is made of a heat resistant material.

8. The sandwich making accessory of claim 1 wherein said top cracker and said bottom cracker are at least one of slices of bread, cake, waffles, graham crackers, cookies, biscuits, or other consumable products.

9. The sandwich making accessory of claim 1 wherein said upper arm and said lower arm are removable from said pivot connector via snap fits to facilitate cleaning.

10. The sandwich making accessory of claim 1 wherein said pivot connector is made of a different material then said upper arm and said lower arm.

11. The sandwich making accessory of claim 1 wherein said proximal ends of said upper arm and said lower arm have a set of tabs that engage with a set of complementary slots in said pivot connector.

12. A sandwich making accessory comprising:
- an upper arm with a distal end terminated with an upper food holding end, where said upper food holding end is configured with a set of rails on opposing sides of said upper food holding end;
- a lower arm with a distal end terminated with a lower food holding end, where said lower food holding end has a pair of side walls and a back wall;
- a pivot connector that joins a proximal end of said upper arm and a proximal end of said lower arm;
- wherein said set of rails are adapted to retain an inserted top cracker when forming a sandwich with a lower cracker retained in said lower food holding end; and
- wherein said proximal ends of said upper arm and said lower arm have a set of tabs that engage with a set of complementary slots in said pivot connector.

\* \* \* \* \*